United States Patent
Chen et al.

(10) Patent No.: US 7,934,438 B2
(45) Date of Patent: *May 3, 2011

(54) BALL SCREW DEVICE HAVING CIRCULATING DEVICE BACKGROUND OF THE INVENTION

(75) Inventors: Yan Yu Chen, Taichung (TW); Yueh Ling Chiu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 758 days.

This patent is subject to a terminal disclaimer.

(21) Appl. No.: 11/980,931

(22) Filed: Oct. 31, 2007

(65) Prior Publication Data

US 2009/0107273 A1    Apr. 30, 2009

(51) Int. Cl.
*F16H 25/22*   (2006.01)
(52) U.S. Cl. .................. 74/89.44; 74/424.82; 74/424.86
(58) Field of Classification Search ................. 74/89.44, 74/424.82–424.84, 424.86, 424.87
See application file for complete search history.

(56) References Cited

U.S. PATENT DOCUMENTS

| | | | | |
|---|---|---|---|---|
| 3,145,580 A | * | 8/1964 | Widmoyer et al. | 74/424.86 |
| 3,971,264 A | | 7/1976 | Detraz et al. | 74/459 |
| 4,953,419 A | | 9/1990 | Schlenker | 74/459 |
| 5,014,568 A | | 5/1991 | Schlenker | 74/424.8 R |
| 5,063,809 A | | 11/1991 | Schlenker | 74/459 |
| 6,023,991 A | | 2/2000 | Yabe et al. | 74/459 |
| 6,024,490 A | * | 2/2000 | Shirai | 384/13 |
| 7,040,189 B2 | * | 5/2006 | Michioka et al. | 74/424.82 |
| 7,516,681 B2 | * | 4/2009 | Hsu | 74/424.86 |
| 2003/0145670 A1 | * | 8/2003 | Fujita et al. | 74/89.44 |
| 2004/0123691 A1 | * | 7/2004 | Hayashi | 74/424.83 |
| 2005/0087031 A1 | * | 4/2005 | Ohkubo et al. | 74/424.85 |

* cited by examiner

*Primary Examiner* — William C Joyce
(74) *Attorney, Agent, or Firm* — Charles E. Baxley

(57) ABSTRACT

A ball screw device includes a screw shaft rotatably engaged with a ball nut, and a number of bearing members received between the ball nut and the screw shaft, and a circulating device for circulating the bearing members, the circulating device includes an elongate member having two end blocks for engaging into the ball nut and having a passage for receiving the bearing members, and includes a housing member and a casing member each having a portion of the passage of the elongate member for allowing the passage of the elongate member to be opened and exposed and for allowing the housing member and the casing member to be formed with molding procedures.

7 Claims, 8 Drawing Sheets

BALL SCREW DEVICE HAVING CIRCULATING DEVICE BACKGROUND OF THE INVENTION

BACKGROUND OF THE INVENTION

1. Field of the Invention

The present invention relates to a ball screw device, and more particularly to a ball screw device having a circulating device for effectively and smoothly receiving and guiding the balls or the rollers or the bearing members to move relative to the ball nut and the screw shaft, and for facilitating the rotational movement of the ball nut and the screw shaft relative to each other in great rotational speeds.

2. Description of the Prior Art

Typical ball screw devices comprise a ball nut rotatably and/or moveably engaged onto a screw shaft, and normally arranged to allow the ball nut to be rotated and/or moved relative to the screw shaft in great rotational speeds. For allowing the ball nut to be smoothly rotated and moved relative to the screw shaft, a suitable bearing device or lubricating structure is further required to be provided and engaged between the ball nut and the screw shaft, for facilitating the rotational movement between the ball nut and the screw shaft.

For example, U.S. Pat. No. 3,971,2648 to Detraz et al. discloses one of the typical screw-and-nut mechanism with ball or roller recirculation including a ball recirculation channel comprising bent, tubular inlet and outlet elements connected to each other by a connecting means, the tubular elements being engaged in a bore of the nut member in such a way as to emerge at the bottom of the thread.

However, the tubular elements are required to be bent from a longitudinal tubular member, and the corner areas or the bent portions of the tubular elements may be distorted such that the balls or the rollers or the bearing members may not suitably move through the tubular elements.

U.S. Pat. No. 4,953,419 to Schlenker, and U.S. Pat. No. 5,063,809 to Schlenker disclose two further typical ball screw and nut assemblies each including a ball return tube having one or more bent portions or elbows for guiding the balls or the rollers or the bearing members.

However, similarly, the return tubes are also required to be bent from a longitudinal tubular member, and the corner areas or the bent portions of the return tubes may be distorted such that the balls or the rollers or the bearing members may not suitably move through the return tubes.

U.S. Pat. No. 5,014,568 to Schlenker discloses a still further typical ball screw and nut assembly including a deflector having a curved and elongate body, and a threaded stem rigidly affixed to the body and secured to or integral with the body, and one or more transfer tubes for guiding the balls or the rollers or the bearing members.

However, similarly, the transfer tubes are also required to be bent from a longitudinal tubular member, and the corner areas or the bent portions of the transfer tubes may be distorted such that the balls or the rollers or the bearing members may not suitably move through the transfer tubes.

U.S. Pat. No. 6,023,991 to Tabe et al. discloses a still further typical ball screw device also including one or more circulation tubes attached to the ball nut for guiding the balls or the rollers or the bearing members.

However, similarly, the circulation tubes are also required to be bent from a longitudinal tubular member, and the corner areas or the bent portions of the circulation tubes may be distorted such that the balls or the rollers or the bearing members may not suitably move through the circulation tubes.

The present invention has arisen to mitigate and/or obviate the afore-described disadvantages of the conventional ball screw devices for such as machine tools or the like.

SUMMARY OF THE INVENTION

The primary objective of the present invention is to provide a ball screw device including a circulating device for effectively and smoothly receiving and guiding the balls or the bearing members to move relative to the ball nut and the screw shaft, and for facilitating the rotational movement of the ball nut and the screw shaft relative to each other in great rotational speeds.

The other objective of the present invention is to provide a ball screw device including a circulating device having a structure for allowing the circulating device to be easily and quickly and precisely formed or made with the molding or mold-injection procedures and to be easily and quickly and readily removed or disengaged from the mold devices.

In accordance with one aspect of the invention, there is provided a ball screw device comprising a screw shaft including an outer thread formed thereon, a ball nut including a bore formed therein for receiving the screw shaft, and including an inner thread formed therein for forming a helical raceway between the ball nut and the screw shaft, the ball nut including two openings formed therein and communicating with the bore of the ball nut, a number of bearing members received in the helical raceway between the ball nut and the screw shaft for facilitating a rotating movement between the ball nut and the screw shaft, and a circulating device including an elongate member having two end blocks for engaging into the openings of the ball nut, the elongate member including a passage formed therein and directed toward the inner thread of the ball nut and the outer thread of the screw shaft for receiving the bearing members, the circulating device includes a housing member and a casing member each including a portion of the passage of the elongate member formed therein, for allowing the passage of the elongate member to be opened and exposed in the housing member and the casing member and for allowing the housing member and the casing member to be easily and precisely formed with molding procedures.

The blocks of the circulating device each include a compartment formed therein for receiving a lubricating oil therein. The blocks of the circulating device each include a cap for closing the compartment of the block and for retaining the lubricating oil in the compartment of the block.

The blocks of the circulating device each include a groove formed therein and communicating with the compartment of the block and communicating with the passage of the elongate member for allowing the lubricating oil in the compartment of the block to flow into the passage of the elongate member and then to flow into the inner thread of the ball nut and the outer thread of the screw shaft.

The blocks of the circulating device each include an oil retaining member engaged into the compartment of each of the blocks of the circulating device for suitably supplying the lubricating oil to lubricate the ball nut and the screw shaft and the bearing members.

The blocks of the circulating device each include a deflecting tongue provided therein for forming a portion of the passage of the elongate member and for directing the passage of the elongate member toward the inner thread of the ball nut and the outer thread of the screw shaft.

The elongate member includes two side portions each having an orifice formed therein for engaging with a fastener which detachably secures the circulating device to the ball nut. The housing member and the casing member each include a portion of the block provided thereon.

The housing member includes a chamber formed therein and formed between two side portions for solidly receiving and retaining the casing member. The housing member includes a cut surface, and the casing member includes a cut surface for snugly or sealingly or solidly mating with the cut surface of the housing member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
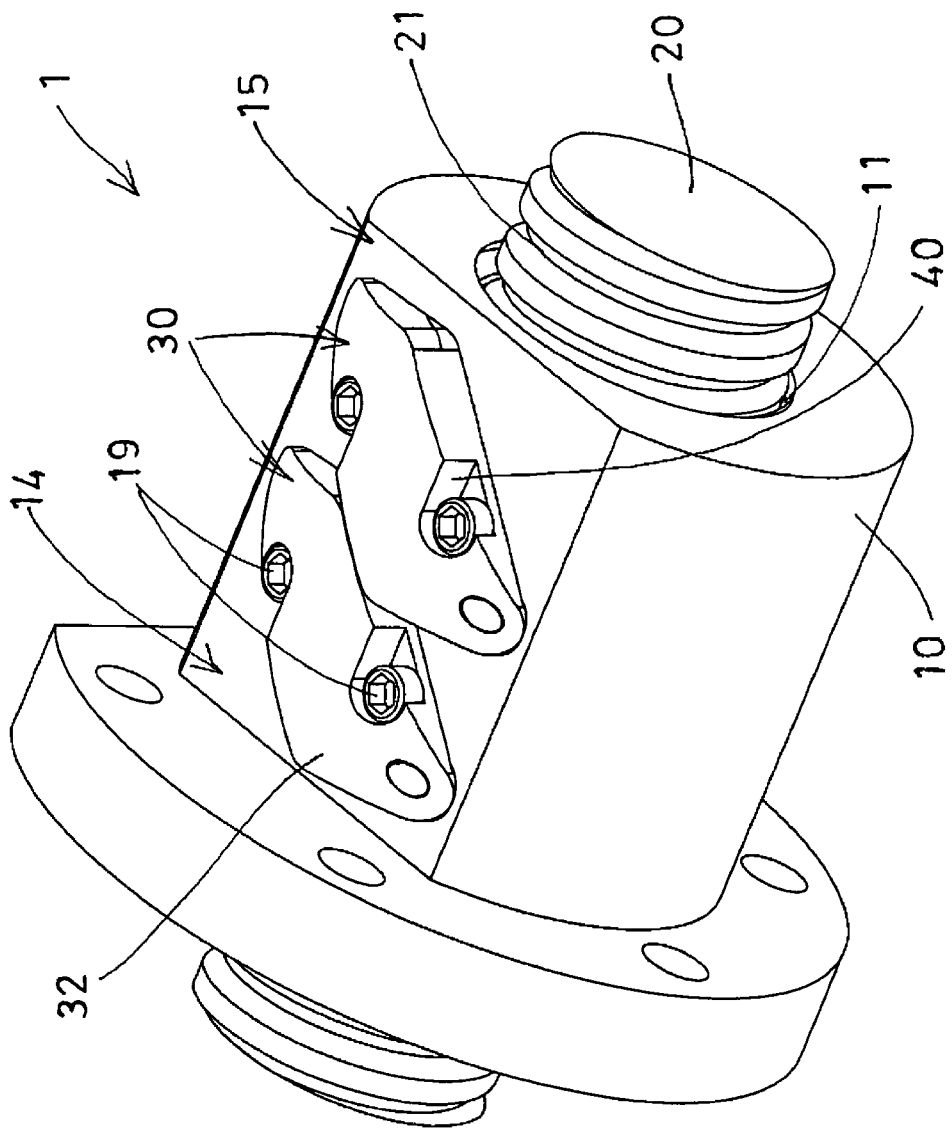
FIG. 1 is a partial perspective view of a ball screw device in accordance with the present invention.
Figure 2:
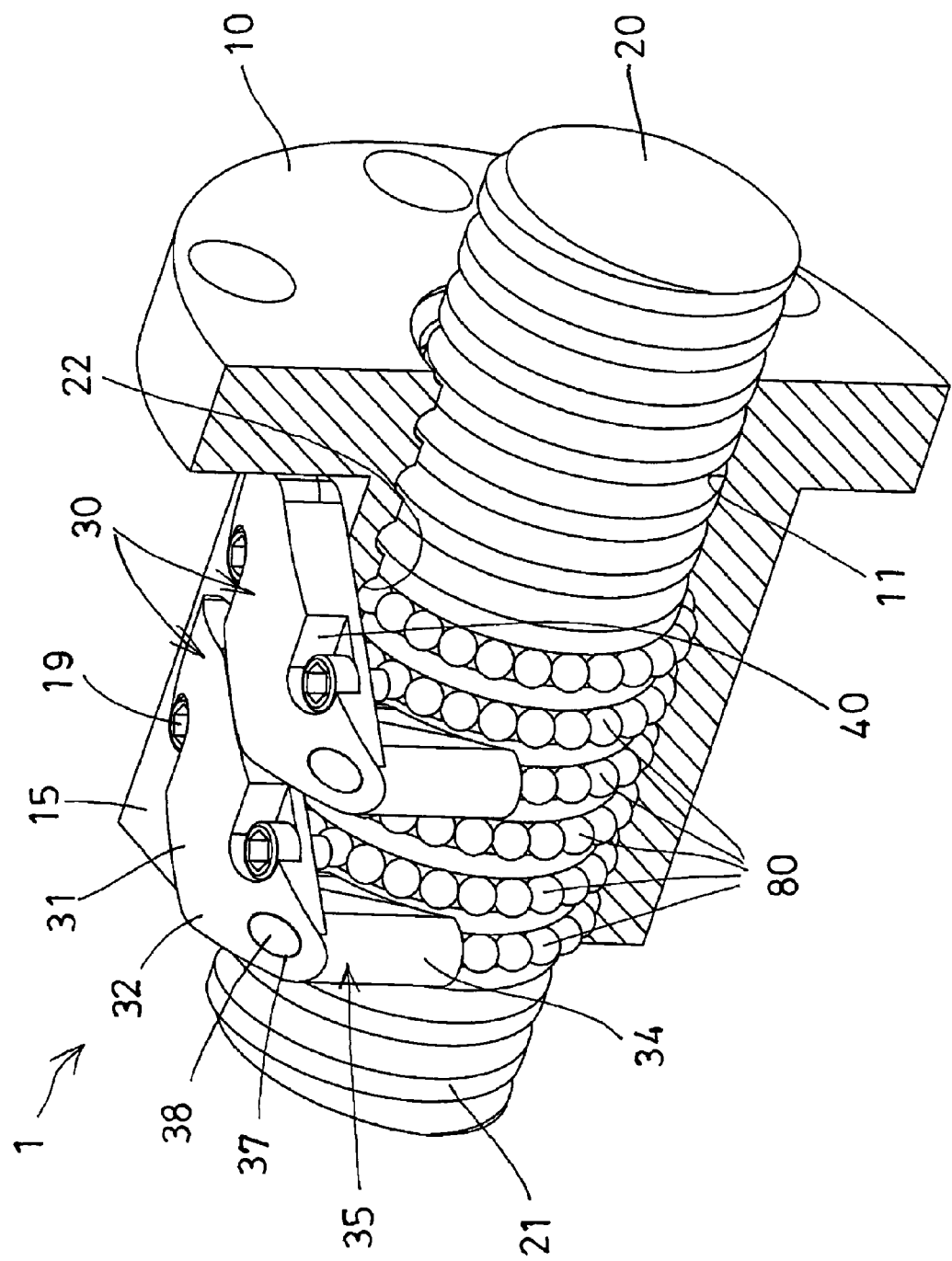
FIG. 2 is another partial perspective view of the ball screw device as seen from an opposite direction, in which one half of the outer ball nut has been cut off for showing an inner structure of the ball screw device.
Figure 3:
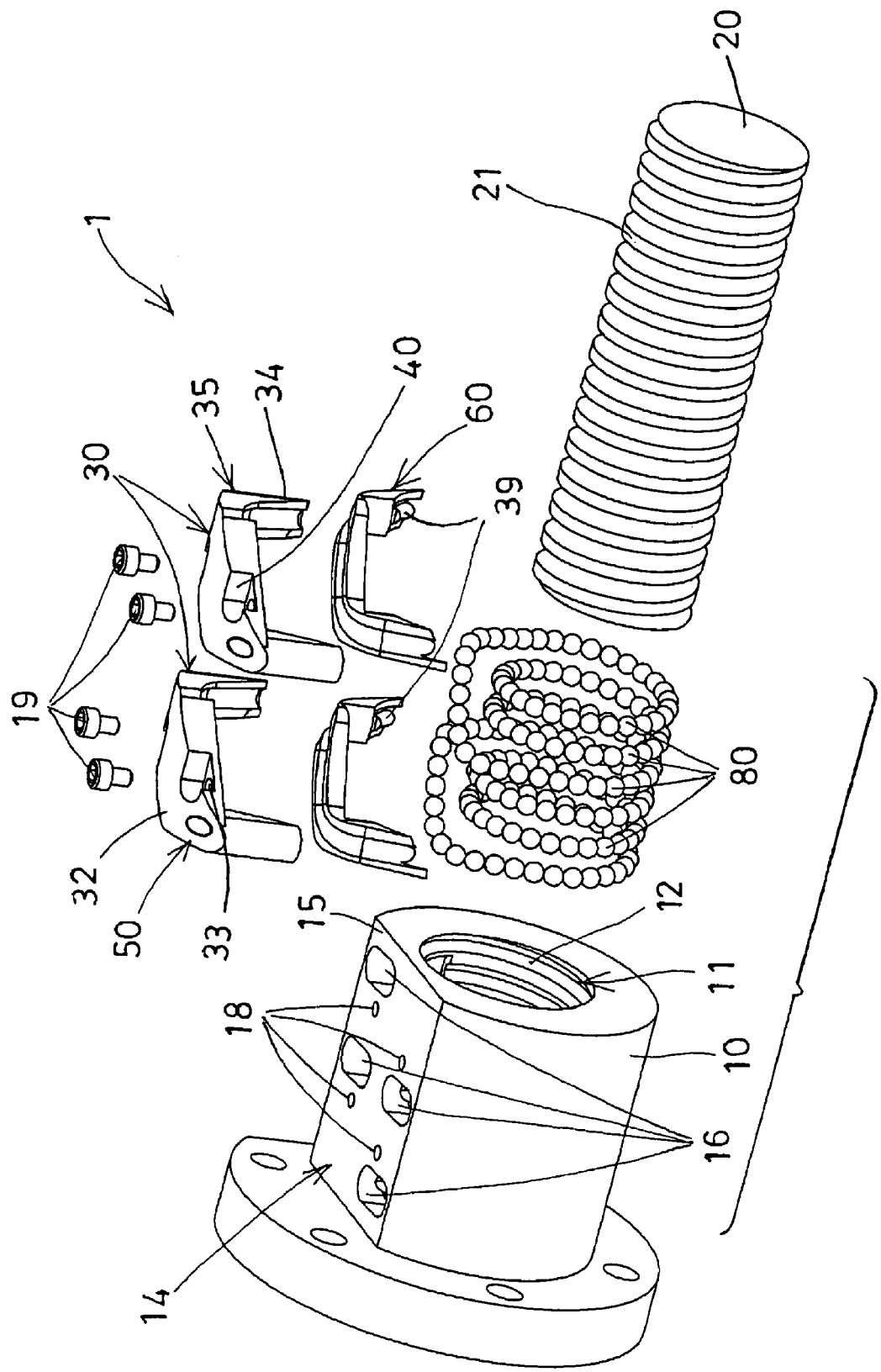
FIG. 3 is a partial exploded view of the ball screw device.

Referring to the drawings, and initially to FIGS. 1-3, a ball screw device 1 in accordance with the present invention comprises an outer ball nut 10 including a bore 11 formed therein for receiving a typical screw shaft 20 and having an inner thread 12 formed therein for threading with or engaging with an outer thread 21 of the screw shaft 20 and for allowing the ball nut 10 to be moved along the screw shaft 20, or for allowing the screw shaft 20 to be rotated and moved relative to the ball nut 10. The threading engagement and/or the rotational engagement between the ball nut 10 and the screw shaft 20 is typical and will not be described in further details.

A multiple turn, helical raceway 22 will be formed between the ball nut 10 and the screw shaft 20 (FIG. 2) for rotatably and/or movably receiving one or more groups of balls or rollers or rolling or ball bearing members 80 (FIGS. 2, 3) therein which may facilitate the rotating movement of the ball nut 10 relative to the screw shaft 20 when the screw shaft 20 is forced or actuated or operated to rotate relative to the ball nut 10 or when the ball nut 10 is forced to rotate relative to the screw shaft 20.

The ball nut 10 includes a cut off portion or a recess 14 formed in the outer peripheral portion thereof, and formed or defined by a flat surface 15, and includes two, four or more openings 16 formed therein and communicating with the bore 11 of the ball nut 10, and one or more (such as four) screw holes 18 formed therein each for threading with or for engaging with a fastener 19 (FIGS. 1-3), and for attaching or securing or mounting one or more ball guide or circulating devices 30.

The circulating devices 30 each include a lateral or longitudinal or elongate body or member 31, one or more (such as two) ears or side portions 32 formed or extended or provided on the elongate member 31 and each having an orifice 33 formed therein for engaging with the fasteners 19 (FIGS. 1-3) which may be threaded or engaged with the screw holes 18 of the ball nut 10 for detachably securing the circulating device 30 to the ball nut 10, and further includes two end blocks 34 formed or provided or attached or secured to the two end portions 35 of the elongate member 31 for engaging into the openings 16 of the ball nut 10 and for allowing the circulating device 30 to be stably anchored or secured or mounted or positioned to the ball nut 10.

Figure 4:
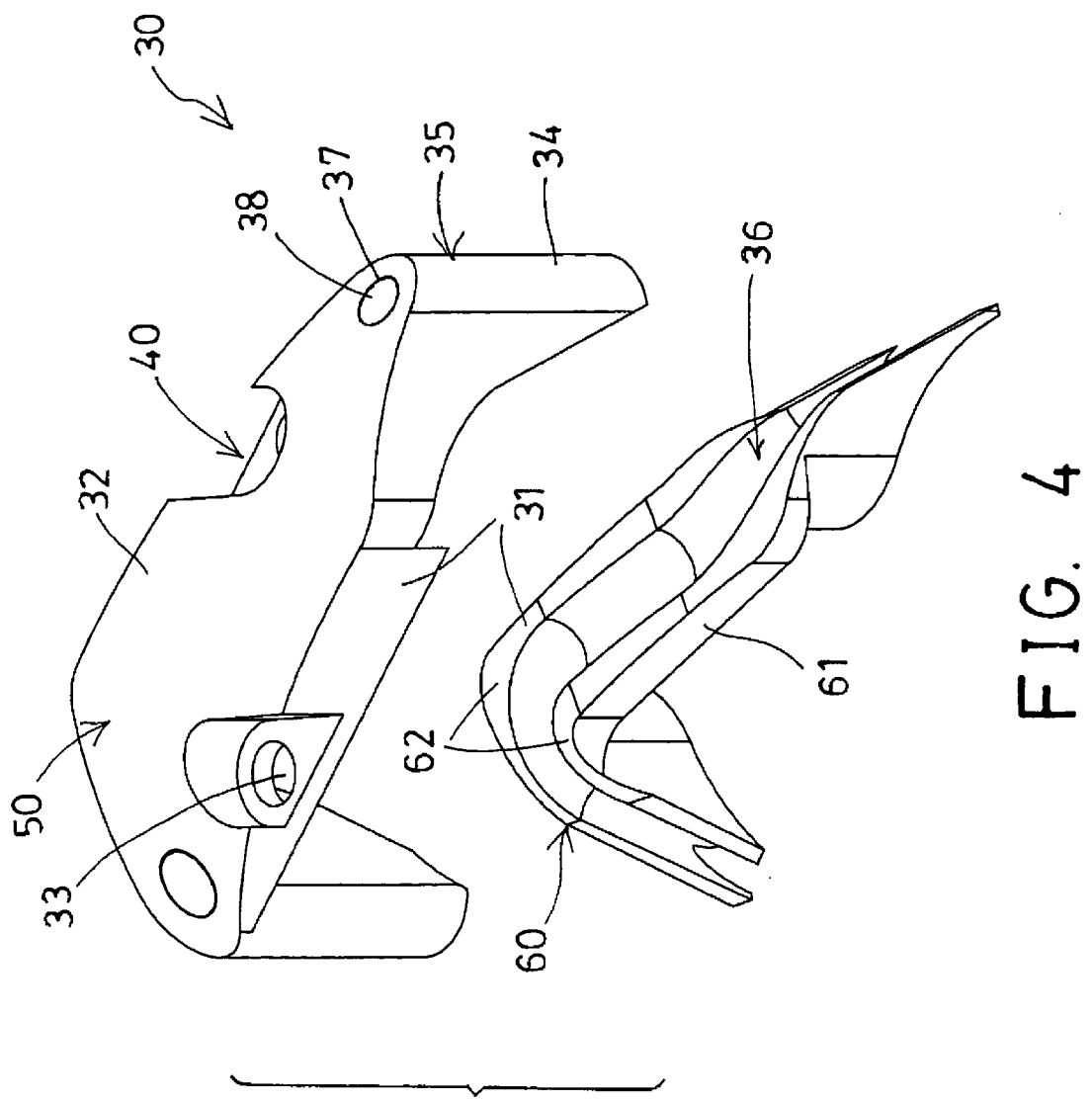
FIG. 4 is an exploded view illustrating the circulating device of the ball screw device as seen from the upper portion of the circulating device.
Figure 5:
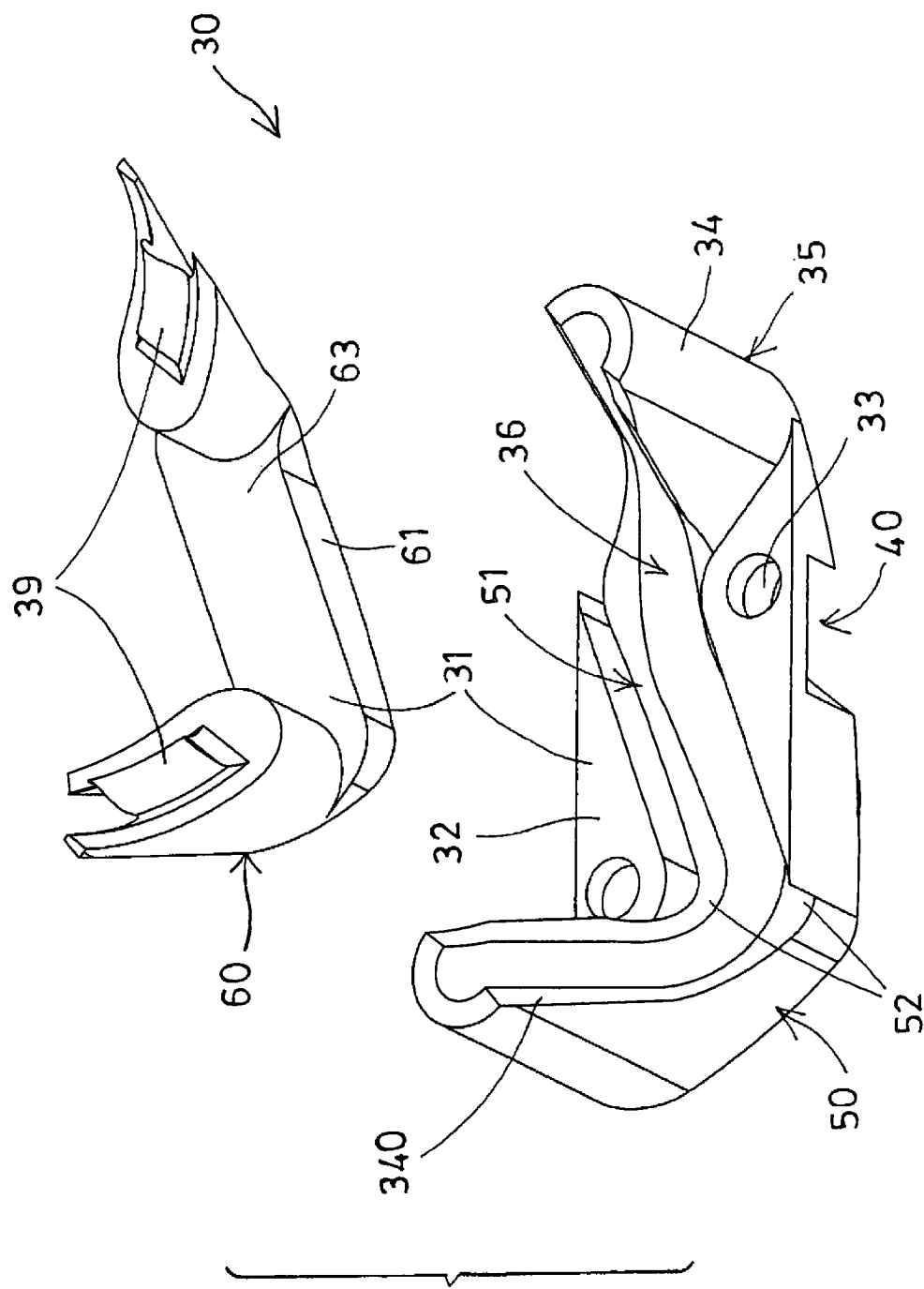
FIG. 5 is another exploded view as seen from the bottom portion of the circulating device.

As shown in FIG. 5, the elongate member 31 includes a passage 36 formed therein and also formed in the end blocks 34 and having a circular cross section and directed toward and tangent to the helical raceway 22 or the inner thread 12 of the ball nut 10 and the outer thread 21 of the screw shaft 20 (FIG. 2) for rotatably and/or movably receiving one or more groups of balls or rollers or rolling or ball bearing members 80 therein and for allowing the ball bearing members 80 to form an endless ball train. The end blocks 34 each include an outer peripheral wall 340 (FIG. 5) formed around the passage 36 and having different thickness. The end blocks 34 each may include a pathway or compartment 37 formed therein (FIGS. 2, 4, 7-8) for receiving a lubricating oil or lubricant therein, and a cap 38 for enclosing or closing the compartment 37 of the end block 34 and for sealingly retaining the lubricating oil or lubricant therein in the compartment 37 of the end block 34.

As shown in FIGS. 3, 5, the end blocks 34 each include a curved or deflecting tongue 39 provided therein for forming a portion of the passage 36 of the elongate member 31 and for suitably directing or guiding the passage 36 of the elongate member 31 toward the inner thread 12 of the ball nut 10 and the outer thread 21 of the screw shaft 20 and for suitably and rotatably and/or movably receiving the rolling or ball bearing members 80 therein. The end blocks 34 each may further include a depression 40 formed therein for receiving an enlarged head portion of the fastener 19 and for preventing the fastener 19 from being extended out of the elongate member 31 of the circulating device 30.

Figure 6:
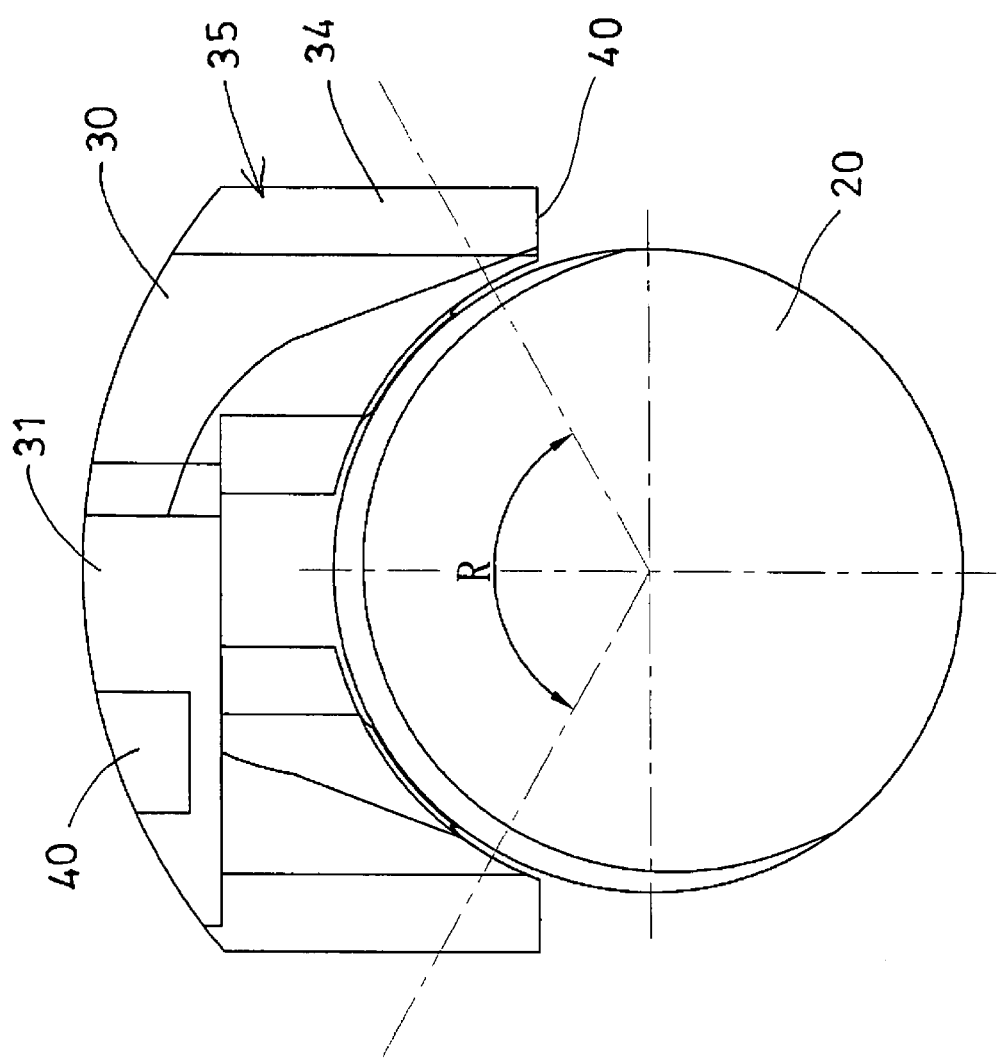
FIG. 6 is an end schematic view illustrating the relative position between the circulating device and the screw shaft of the ball screw device.
Figure 7:
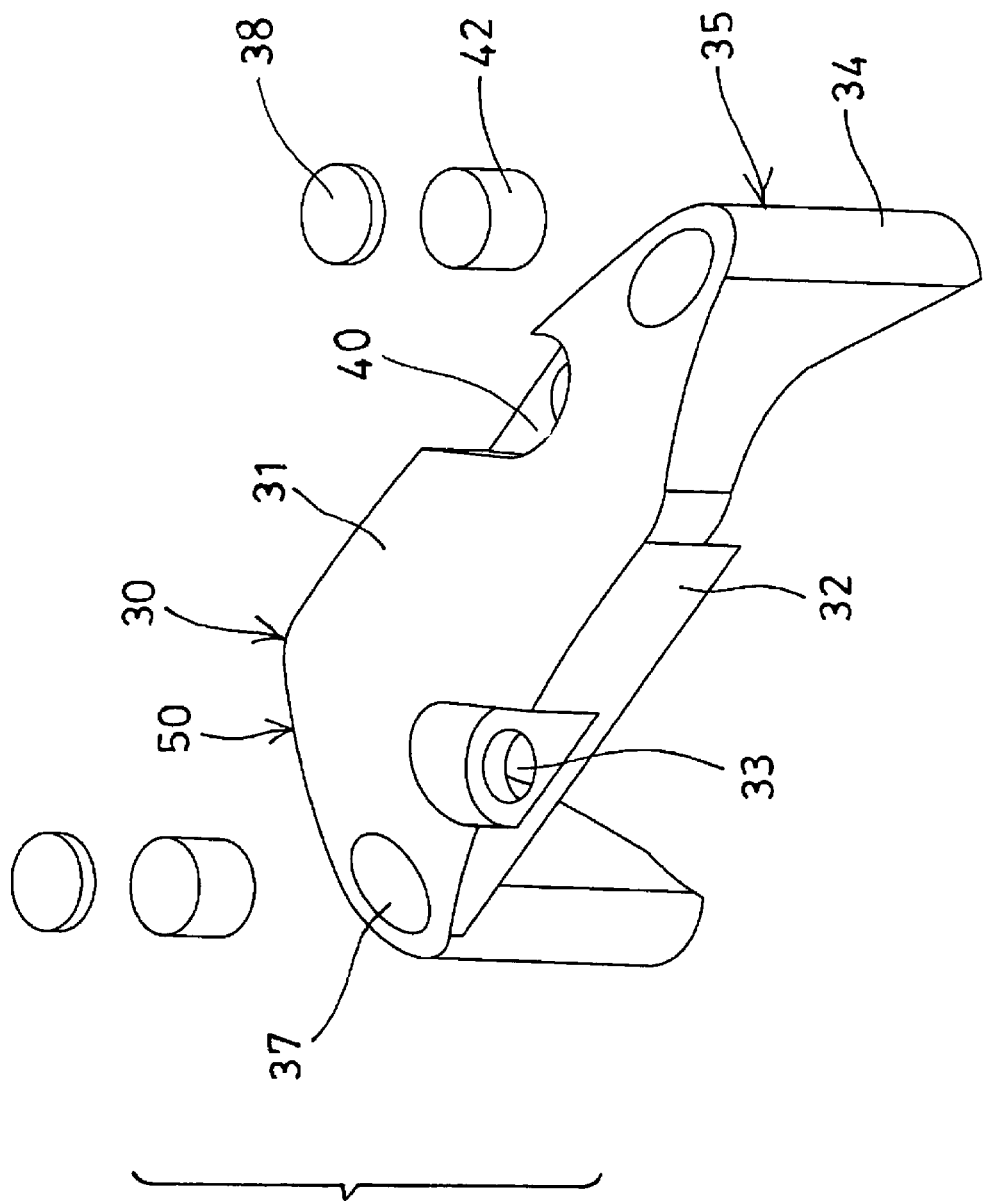
FIG. 7 is a further partial exploded view of the circulating device.
Figure 8:
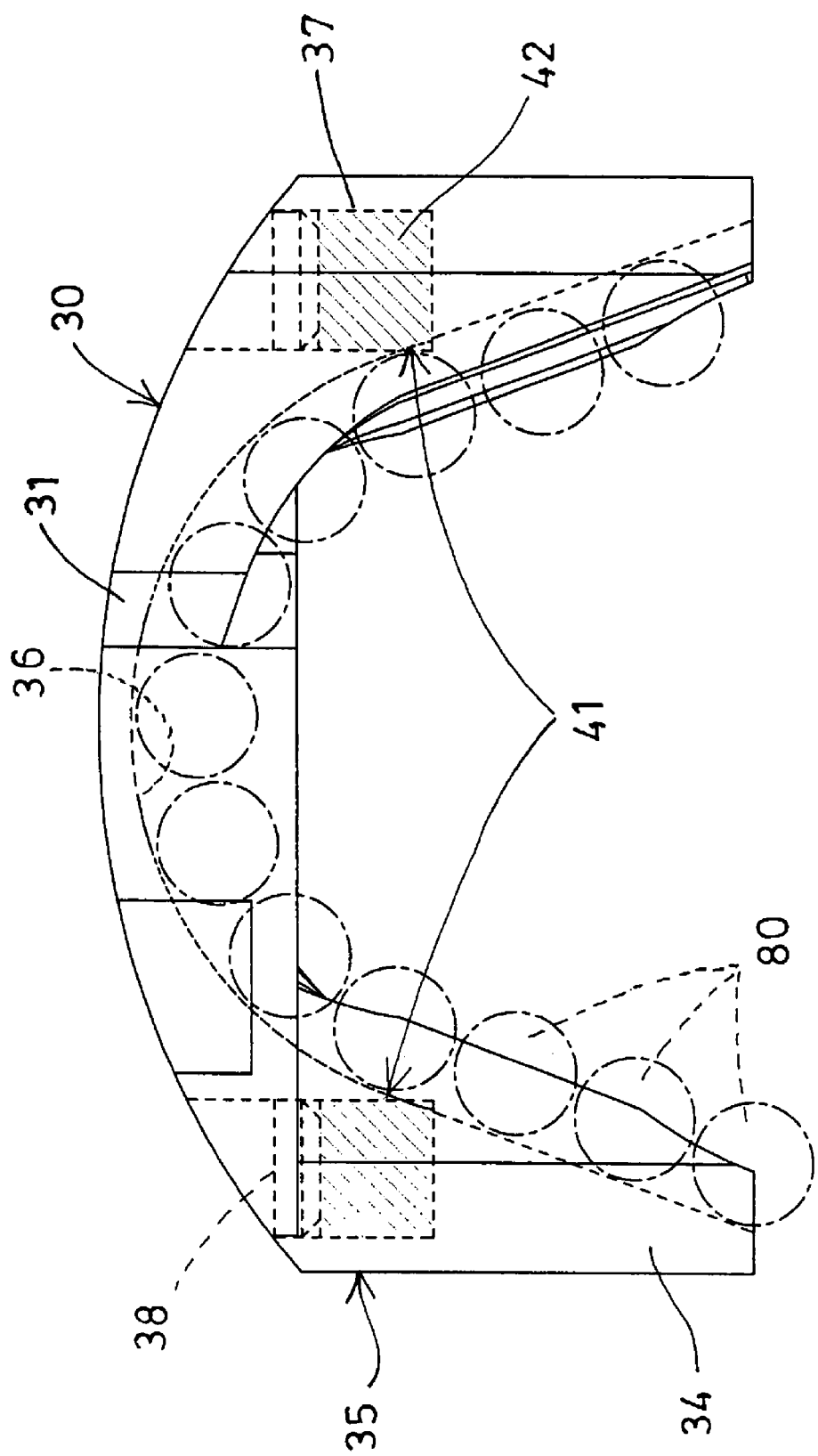
FIG. 8 is a partial plan schematic view of the circulating device of the ball screw device.

As shown in FIG. 8, the end blocks 34 of the elongate member 31 each may include a groove 41 formed therein and communicating with the compartment 37 of the end block 34 and also communicating with the passage 36 of the elongate member 31 for allowing the lubricating oil or lubricant retained in the compartment 37 of the end block 34 to flow into the passage 36 of the elongate member 31 and then to flow into the inner thread 12 of the ball nut 10 and the outer thread 21 of the screw shaft 20 and/or the helical raceway 22 formed between the ball nut 10 and the screw shaft 20. A spongy or oil retaining member 42 (FIGS. 7, 8) may be engaged into the compartment 37 of each of the end blocks 34 for suitably retaining and supplying the lubricating oil or lubricant through the groove 41 of the end block 34 and to lubricate the ball bearing members 80. The bottom surfaces 44 of the end blocks 34 are preferably flush with each other (FIG. 6), and the end blocks 34 and the elongate member 31 cover the outer peripheral portion of the screw shaft 20 for a degree R no more than 180 degrees.

As shown in FIGS. 3-5, the circulating device 30 includes an anti-symmetric structure and may be separated into or formed by an outer or first or primary or cover or housing member 50 and an inner or second or secondary or casing member 60. It is preferable that the outer housing member 50 and the inner casing member 60 each include one half or a portion of the passage 36 of the elongate member 31 therein, for allowing the passage 36 of the elongate member 31 to be opened and exposed and thus for allowing the outer housing member 50 and the inner casing member 60 to be easily and quickly and precisely formed or made with the molding or mold-injection procedures and to be easily and quickly and readily removed or disengaged from the mold devices.

The outer housing member 50 includes a chamber or recess 51 formed therein and formed between the side portions 32 of the elongate member 31, and formed or defined by a bottom or base or cut surface 52. The inner casing member 60 is to be engaged into the recess 51 of the outer housing member 50, and includes two side surfaces 61 for engaging with the side portions 32 of the elongate member 31, and also includes a base or cut surface 62 formed therein for snugly mating with the upper or cut surface 52 of the outer housing member 50, and for sealingly securing to the outer housing member 50 with such as adhesive materials, latches or fasteners (not shown), or by welding procedures or the like. It is preferable that the inner casing member 60 includes a base surface 63 flushing with or no higher than the side portions 32 of the elongate member 31.

It is to be noted that the outer housing member 50 and the inner casing member 60 each include one half or a portion of the elongate member 31 and one half or a portion of the end blocks 34, and each include one half or a portion of the passage 36 of the elongate member 31 formed or provided therein respectively for allowing the passage 36 of the elongate member 31 to be opened and exposed and thus for allowing the outer housing member 50 and the inner casing member 60 to be easily and quickly and precisely formed or made with the molding or mold-injection procedures and to be easily and quickly and readily removed or disengaged from the mold devices or the like. The outer housing member 50 includes the recess 51 formed between the side portions 32 for solidly receiving and retaining the inner casing member 60.

Accordingly, the ball screw device in accordance with the present invention includes a circulating device for effectively and smoothly receiving and guiding the balls or bearing members to move relative to the ball nut and the screw shaft, and having a structure for allowing the circulating device to be easily and quickly and precisely formed or made with the molding or mold-injection procedures or methods and to be easily and quickly and readily removed or disengaged from the mold devices.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
   a screw shaft including an outer thread formed thereon,
   a ball nut including a bore formed therein for receiving said screw shaft, and including an inner thread formed therein for forming a helical raceway between said ball nut and said screw shaft, said ball nut including two openings formed therein and communicating with said bore of said ball nut,
   a plurality of bearing members received in said helical raceway between said ball nut and said screw shaft for facilitating a rotating movement between said ball nut and said screw shaft, and
   a circulating device including an elongate member having two end blocks for engaging into said openings of said ball nut, said elongate member including a passage formed therein and directed toward said inner thread of said ball nut and said outer thread of said screw shaft for receiving said bearing members, said end blocks each including a deflecting tongue provided therein for forming a portion of said passage of said elongate member and for directing said passage of said elongate member toward said inner thread of said ball nut and said outer thread of said screw shaft, said end blocks of said circulating device each including a compartment formed therein for receiving a lubricating oil therein, and each including a groove formed therein and communicating with said compartment of said end block and communicating with said passage of said elongate member for allowing said lubricating oil in said compartment of said end block to flow into said passage of said elongate member and then to flow into said inner thread of said ball nut and said outer thread of said screw shaft, and said circulating device including an outer housing member and an inner casing member each including a portion of said passage of said elongate member formed therein.

2. The ball screw device as claimed in claim 1, wherein said end blocks cover an outer peripheral portion of said screw shaft for a degree (R) no more than 180 degrees.

3. The ball screw device as claimed in claim 1, wherein said passages of said end blocks are tangent to said helical raceway between said ball nut and said screw shaft.

4. The ball screw device as claimed in claim 1, wherein said end blocks each include an outer peripheral wall formed around said passage and having different thickness.

5. The ball screw device as claimed in claim 1, wherein said elongate member includes two side portions each having an orifice formed therein for engaging with a fastener which detachably secures said circulating device to said ball nut.

6. The ball screw device as claimed in claim 1, wherein said end blocks of said circulating device each include a cap for closing said compartment of said end block and for retaining said lubricating oil in said compartment of said end block.

7. The ball screw device as claimed in claim 1, wherein said end blocks of said circulating device each include an oil retaining member engaged into said compartment of each of said end blocks of said circulating device.

* * * * *